Patented Aug. 22, 1950

2,519,470

UNITED STATES PATENT OFFICE 2,519,470

2 - METHYL - 3 - P - TOLUENESULFONOXY - 4 - P-TOLUENESULFONYLAMINOMETHYL-5-PHOSPHONOXYMETHYLPYRIDINE AND INTERMEDIATES THEREFOR

Dorothea Heyl Hoffman, Rahway, N. J., assignor to Merck & Co., Inc., Rahway, N. J., a corporation of New Jersey No Drawing. Application February 19, 1949, Serial No. 77,446

5 Claims. (Cl. 260—296)

1

This invention relates to the preparation of a new chemical compound, 2-methyl-3-p-toluenesulfonoxy - 4 - p - toluene-sulfonylaminomethyl-5-phosphonoxymethylpyridine. It is also concerned with the preparation of the calcium salt of 2 - methyl-3-hydroxy-4-aminomethyl-5-phosphonoxymethylpyridine produced as an intermediate in my process.

The new chemical compound with which my invention is concerned, the calcium salt of 2-methyl - 3 - hydroxy - 4 - aminomethyl - 5-phosphonoxymethylpyridine is useful as a growth factor for certain microorganisms and has been found to form a bright red color when coupled with diazotized aniline. It has also been found that the novel compound 2-methyl-3-p-toluenesulfonoxy - 4 - p - toluenesulfonylaminomethyl-5 - phosphonoxymethylpyridine definitely establishes the structure for pyridoxamine phosphate (2 - methyl - 3-hydroxy-4-aminomethyl-5-phosphonoxymethylpyridine).

In preparing my novel chemical compounds, I utilize as the starting material, 2-methyl-3-hydroxy - 4 - aminomethyl - 5-hydroxymethylpyridine dihydrohalide, which has the structural formula:

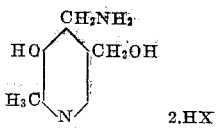

and phosphorus oxyhalide. The reaction is carried out by treating an aqueous solution of 2-methyl - 3 - hydroxy-4-aminomethyl-5-hydroxymethylpyridine dihydrohalide with phosphorus oxyhalide at temperatures below 50° C. Hydrogen halide is removed from the solution and said solution is neutralized with a suspension of calcium carbonate in water. The calcium hydrogen phosphate and calcium bicarbonate salts which separate from the solution are removed and the filtrate is diluted with ethyl alcohol and chilled. This results in the precipitation of a white gelatinous material, the calcium salt of 2-methyl - 3 - hydroxy - 4 - aminomethyl - 5-phosphonoxymethylpyridine which may be identified by the following formula:

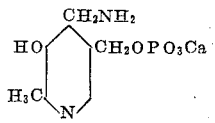

This new chemical compound, the calcium salt of 2-methyl-3-hydroxy-4-aminomethyl-5-phos-

2 phonoxymethylpyridine is useful as a growth factor for certain microorganisms and has been found to form a bright red color when coupled with diazotized aniline.

A suspension of the calcium salt of 2-methyl-3 - hydroxy - 4 - aminomethyl - 5 - phosphonoxymethylpyridine in sodium hydroxide may be treated with a solution of p-toluenesulfonyl chloride in ether. After the mixture is centrifuged, the ether layer is discarded. From the aqueous layer is recovered 2-methyl-3-p-toluenesulfonoxy - 4 - p-toluenesulfonylaminomethyl-5-phosphonoxymethylpyridine which has the structural formula:

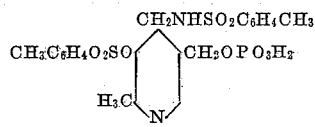

This novel chemical compound, 2-methyl-3-p-toluenesulfonoxy - 4 - p - toluenesulfonylaminomethyl-5-phosphonoxymethylpyridine definitely establishes the structure for pyridoxamine phosphate (2 - methyl - 3-hydroxy-4-aminomethyl-5-phosphonoxymethylpyridine), since it is found that the phenolic hydroxyl group is no longer free as shown by a negative ferric chloride test.

The preparation of my novel compound and the novel intermediate chemical compound obtained during the course of the reactions by which they may be secured may be illustrated by the following specific examples. It should be noted, of course that these examples are intended to be illustrative of the methods and procedures utilized in preparing these compounds, and that they are not intended to be restricted or to be regarded as embodying the only way in which my novel compounds can be formed and recovered.

EXAMPLE 1

*Preparation of the calcium salt of 2-methyl-3-hydroxy - 4 - aminomethyl - 5 - phosphonoxymethylpyridine*

In a flask equipped with a mechanical stirrer and immersed in a water bath was placed a solution of 4.28 grams of 2-methyl-3-hydroxy-4-aminomethyl-5-hydroxymethylpyridine dihydrochloride dissolved in 25 cc. of water. The solution was stirred while 15 cc. of phosphorus oxychloride was added dropwise at such a rate that the temperature did not rise above 50° C. The addition required approximately fifty minutes, and the mixture was then stirred for about twenty minutes. After evacuation of the mixture to remove as much hydrogen chloride as possible, the solution was diluted with 35 cc. of water. A suspension of 90 grams of calcium carbonate in 40 cc. of water was then added to the reaction mixture with occasional stirring at 5–10° C. until the reaction mixture was adjusted to a pH of 5–6. After an hour's chilling, the precipitated calcium phosphate and calcium bicarbonate salts were collected on a filter and washed with 40 cc. of ice water. The combined filtrate and washings were cleared by filtration through a fine sintered glass funnel which resulted in 65 cc. of light greenish-yellow solution. This solution was then diluted with 200 cc. of ethyl alcohol and chilled. The white gelatinous material which precipitated was separated by centrifuging and washed twice with alcohol and once with ether. Upon drying there was secured 0.11 gram of crude calcium salt of 2-methyl-3-hydroxy-4-aminomethyl-5-phosphonoxymethylpyridine.

EXAMPLE 2

*Preparation of 2-methyl-3-p-toluenesulfonoxy-4 - toulenesulfonylaminomethyl - 5 - phosphonoxymethyl-pyridine*

To a suspension of 0.49 gram of the calcium salt of 2-methyl-3-hydroxy-4-aminomethyl-5-phosphonoxymethylpyridine in 10 cc. of N sodium hydroxide was added a solution of 1 gram of p-toluenesulfonyl chloride in 10 cc. of ether. The reaction mixture was shaken for four hours and then centrifuged. The ether layer was separated, and the suspension in water was washed three times with ether. The resulting mixture consisted of three layers—two solid layers separated by a solution. The bottom, solid layer was separated, suspended in water, cooled in an ice bath, and acidified with hydrochloric acid. The sticky mass which resulted was removed and dissolved in methyl alcohol. The sticky mass dissolved at once, and crystals rapidly separated from the solution. The solution was filtered and washed with methyl alcohol and ether. There was secured 2-methyl-3-p-toluenesulfonoxy-4-p - toluenesulfonylaminomethyl-5-phosphonoxymethylpyridine having a melting point of 189–190° C. (dec.). In this tosyl derivative the phenolic hydroxyl group is no longer free, as is shown by a negative ferric chloride test.

Analysis calculated for $C_{22}H_{25}N_2O_9PS$: C, 47.47; H, 4.53; N, 5.03; P, 5.57; S, 11.52. Found: C, 47.17; H, 4.71; N, 5.64; P, 5.88; S, 12.52.

It should be understood that various changes may be made in my process as herein described without affecting the improved results obtained. Thus, various modifications of conditions as to time, temperature, alkalinity, acidity, etc., and various changes in procedure differing from those herein given as illustrative of the preferred embodiments of my invention may be made without departing from the scope thereof. Accordingly, the scope of my invention is to be determined in accordance with the prior art and appended claims.

I claim:

1. The calcium salt of 2-methyl-3-hydroxy-4-aminomethyl-5-phosphonoxymethylpyridine.

2. 2 - methyl - 3 - p - toluenesulfonoxy-4-p-toluenesulfonylaminomethyl - 5 - phosphonoxymethylpyridine.

3. The process which comprises reacting 2-methyl - 3 - hydroxy - 4 - aminomethyl - 5 - hydroxymethylpyridine hydrochloride with phosphorus oxychloride in aqueous medium, neutralizing the reaction mixture with calcium carbonate, adding alcohol to the filtrate of said mixture whereby precipitating the calcium salt of 2 - methyl - 3 - hydroxy - 4 - aminomethyl - 5-phosphonoxymethylpyridine, recovering the latter precipitate, reacting a sodium hydroxide suspension of said precipitate with an ether solution of p-toluenesulfonyl chloride and recovering 2 - methyl - 3 - p -toluenesulfonoxy - 4 - p-toluenesulfonylaminomethyl - 5 - phosphonoxymethylpyridine.

4. The process which comprises reacting 2-methyl - 3 - hydroxy - 4 - aminomethyl - 5 - hydroxymethylpyridine hydrochloride with phosphorus oxychloride in aqueous solution, neutralizing the reaction mixture with calcium carbonate, adding alcohol to the filtrate of said mixture whereby precipitating the calcium salt of 2-methyl - 3 - hydroxy - 4 - aminomethyl - 5 - phosphonoxymethylpyridine and recovering the latter precipitate.

5. The process which comprises reacting a sodium hydroxide suspension of the calcium salt of 2 - methyl - 3 - hydroxy - 4 - aminomethyl - 5-phosphonoxymethylpyridine with an ether solution of p-toluenesulfonyl chloride and recovering 2 - methyl - 3 - p - toluenesulfonoxy - 4 - p-toluenesulfonylaminomethyl - 5 - phosphonoxymethylpyridine.

DOROTHEA HEYL HOFFMAN.

No references cited.